United States Patent [19]

Kyle

[11] Patent Number: 4,493,378

[45] Date of Patent: Jan. 15, 1985

[54] TERMINAL ASSEMBLY

[76] Inventor: James C. Kyle, 24372 Via San Clemente, Mission Viejo, Calif. 92692

[21] Appl. No.: 284,129

[22] Filed: Jul. 16, 1981

[51] Int. Cl.[3] ........................ H01B 17/26; C03C 27/02

[52] U.S. Cl. .............................. 174/152 GM; 403/29; 403/30

[58] Field of Search ............... 174/50.58, 50.61, 50.63, 174/152 GM; 65/33, 36, 42, 59.1, 59.3, 59.31, 59.34, 59.35, 59.4, 59.5, 59.6; 228/122, 903; 403/28, 29, 30, 179; 429/181

[56] References Cited

U.S. PATENT DOCUMENTS

| | | | |
|---|---|---|---|
| 1,558,524 | 10/1925 | Winninghoff | 403/29 |
| 2,100,187 | 11/1937 | Handrek | 403/30 |
| 2,114,869 | 4/1938 | Bol et al. | 174/50.61 |
| 2,136,052 | 11/1938 | Hurley | 174/152 GM X |
| 2,517,019 | 8/1950 | Nordberg | 403/29 |
| 4,282,395 | 8/1981 | Hagemann | 403/29 X |
| 4,308,323 | 12/1981 | Bowsky | 429/181 |

FOREIGN PATENT DOCUMENTS

| | | | |
|---|---|---|---|
| 798663 | 7/1958 | United Kingdom | 65/42 |

*Primary Examiner*—Laramie E. Askin

*Attorney, Agent, or Firm*—Ellsworth R. Roston; Charles H. Schwartz

[57] ABSTRACT

First and second members are disposed in spaced relationship to each other. The members may be electrically conductive. The first member may be provided with a particular coefficient of thermal expansion which is higher than the coefficient of the second member. A plurality of layers of insulating material are disposed between the first and second members and are hermetically sealed to one another and to the first and second members. Each of the layers of insulating material has a coefficient of thermal expansion less than the particular coefficient. The progressive layers of insulating material from the first member have coefficients of thermal expansion of decreased value. This causes the layers of insulating material to have coefficients of thermal expansion which approach the coefficient of the second member with progressive distances toward the second member. A third member may be disposed between the second member and one of the insulating layers in hermetically sealed relationship to the second member and such insulating layer. The third member may be provided with a coefficient of thermal expansion corresponding substantially to that of the first member. Alternatively, an additional layer of insulating material may be disposed between such layer of insulating material and the second member. This layer may be provided with properties of resisting substantial forces without any deterioration in the hermetic seal.

50 Claims, 3 Drawing Figures

TERMINAL ASSEMBLY

This invention relates to terminal assemblies and more particularly relates to terminal assemblies which are hermetically sealed and which are able to withstand considerable ranges of temperatures without any degradation of the seals. The invention also relates to terminal assemblies which are able to withstand considerable pressures at such elevated temperatures without any degradation of the seals.

Many applications require terminal assemblies in which the components in the terminal assemblies are disposed in hermetically sealed relationship. In a number of such applications, the terminal assemblies often have to be able to withstand a considerable range of temperatures without any degradation of the seals. In at least some of these applications, the terminal assemblies also have to be able to withstand considerable pressures at the elevated temperatures without any degradation of the seals. For example, such terminal assemblies are required in the recovery of petroleum from beneath the surface of the earth. In such systems, the terminal assemblies are subjected to high temperatures and high pressures. As a result, the terminal assemblies now in use in such petrochemical installations have only a limited life expectancy. Furthermore, when the terminal assemblies fail, it is difficult and expensive to replace the terminal assemblies because the pumping apparatus within the earth has to be withdrawn to a position above the earth where the proper replacement can be made.

A substantial effort has been devoted for an extended number of years to provide a terminal assembly which will be able to withstand a considerable range of temperatures without any degradation of the seal. A substantial effort has also been made over an extended period of time to provide a terminal assembly which will be able to withstand considerable pressures at elevated temperatures such as occur in oil well installations. A considerable effort has further been devoted to provide a terminal assembly which will be able to provide optimum electrical insulation at such elevated temperatures and pressures. Such efforts have been particularly pronounced in recent years because of the high cost and considerable difficulty in recovering oil from beneath the earth surface. In spite of such efforts, relatively little progress has been made in providing satisfactory solutions to such problems.

This invention provides a terminal assembly which overcomes the above difficulties. The terminal assembly of this invention is hermetically sealed and is able to operate satisfactorily through a considerable range of temperatures in excess of 1000° F. without any degradation of such seal. The terminal assembly of this invention is also able to withstand considerable pressures at such elevated temperatures without any degradation of such seal. For example, the terminal assembly is able to withstand a minimum of fifty (50) pounds tensile pull on a terminal pin in the assembly at elevated temperatures as high as 1,000° F. without any degradation of the seal. The terminal assembly provides an electrical resistivity at least as high as 10,000 megohms at a high voltage such as 500 volts DC even at such elevated temperatures and pressures.

In one embodiment of the invention, first and second members are disposed in spaced relationship to each other. The members may be electrically conductive. A plurality of layers of insulating material are disposed between the first and second members and are hermetically sealed to one another and to the first and second members. The first member may be provided with a particular coefficient of thermal expansion which is higher than the coefficient of the second member. Each of the layers of insulating material has a coefficient of thermal expansion less than the particular coefficient. The progressive layers of insulating material from the first member have coefficients of thermal expansion of decreased value. This causes the layers of insulating material to have coefficients of thermal expansion which approach the coefficient of thermal expansion of the second member with progressive distances toward the second member.

A third member may be disposed between the second member and one of the insulating layers in hermetically sealed relationship to the second member and such insulating layer. The third member may be provided with a coefficient of thermal expansion corresponding substantially to that of the first member. Alternatively, an additional layer of insulating material may be disposed between such layer of insulating material and the second member. This additional layer may be provided with properties of resisting substantial forces without any deterioration in the hermetic seal.

The first member may be made from a particular material such as a stainless steel of the 300 and 400 series and may also be made from nickel, Inconel or titanium. The second member may be made from a suitable material such as molybdenum. The third member may be made from a suitable material selected from a group consisting of nickel, Inconel, titanium and a stainless steel of the 300 and 400 series.

Figure 1:
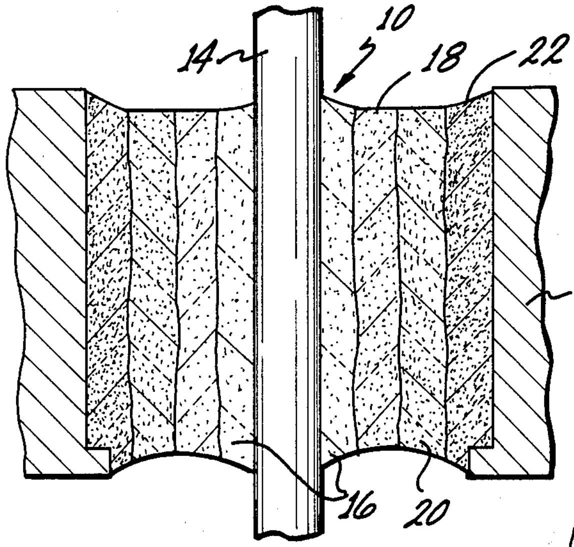
FIG. 1 is a fragmentary sectional view of one embodiment of the invention.

In the embodiment of the invention shown in FIG. 1, a terminal assembly generally indicated at 10 is provided. The terminal assembly 10 includes a ferrule such as a hollow sleeve 12 and a terminal pin 14 disposed in spaced relationship to the ferrule. When the ferrule is a hollow sleeve, the terminal pin 14 is disposed within the sleeve in spaced relationship to the sleeve. The sleeve 12 may be made from a suitable material such as a stainless steel of the 300 and 400 series. Stainless steel of the 300 series has a coefficient of thermal expansion of approximately $9.6\times10^{-6}$/in/in/°F. and stainless steel of the 400 series has a coefficient of thermal expansion of approximately $5.8\times10^{-6}$/in/in/°F. It may also be made from titanium, nickel or Inconel. Inconel is an alloy containing such metals as nickel, cobalt, vanadium and chromium. The terminal pin 14 may be made from a suitable material such as molybdenum. Molybdenum has a coefficient of thermal expansion of $2.7\times10^{-6}$/in/in°F.

Layers 16, 18, 20 and 22 of insulating material are disposed in a stacked relationship between the terminal pin 14 and the ferrule 12 and are fused to the terminal pin and the ferrule and to one another. The layer 16 is hard and is impervious to considerable forces such as a minimum of fifty (50) pounds tensile pull on the terminal pin. The layer 16 is also able to withstand a considerable range of temperatures without any degradation of the hermetic seal provided by the layer. The layer 16 is primarily polycrystalline and has nonviscous properties even when subjected to such elevated temperatures as temperatures to 1,000° F.

The layer 16 is fused to the terminal pin 14 at an elevated temperature such as approximately 1800° F. The layer 16 provides a minimum electrical resistance of 10,000 megohms when subjected to a direct potential as high as 500 volts even at the considerable pressures specified above and at elevated temperatures of 1,000° F.

The layer 18 is formed from an insulating material different from that constituting the layer 16. The layer 18 is fused to the layer 16 and to the layer 20. The layer 18 is primarily amorphous and is relatively viscous at elevated temperatures approaching 1,000° F. The layer 18 is fused to the layers 16 and 20 at an elevated temperature such as approximately 1600° F. The insulating material constituting the layer 18 has properties of maintaining a good hermetic seal with the members 12 and 14 and the layers 16, 20 and 22 of insulating material even when subjected to an elevated temperature such as approximately 1,000° F. for an extended period such as 48 hours.

In the areas of fusion between the layers 16 and 18, the fused material constitutes a mixture of the insulating material forming the layers 16 and 18. This causes the mixture to have characteristics providing a composite of the characteristics of the insulating materials defining the layers 16 and 18. Specifically, the fused material in the mixture is more crystalline than the layer 18 but less crystalline than the layer 16. Furthermore, the fused material in the mixture is able to withstand higher temperatures than the insulating material in the mixture 16 without any degradation of the seals produced between the layers. The material is also able to withstand higher forces than the layer 18 without any degradation.

The layer 20 in turn fuses to the layer 18 at a suitable temperature such as approximately 1200° F. The layer 22 in turn fuses to the layer 20 and the ferrule 12 at a suitable temperature such as approximately 1160° F. The layers 20 and 22 respectively have coefficients of thermal expansion higher than the layers 18 and 16 and the layer 20 has a coefficient of thermal expansion less than that of the layer 22. Thus, as will be seen, the layers 16, 18, 20 and 22 have coefficients of thermal expansion less than the coefficient of thermal expansion of the member 12 but greater than that of the terminal pin 14.

The relationship between the coefficients of thermal expansion of the layers 18, 20 and 22 and the melting temperatures of these layers offers certain advantages. For example, the melting temperatures increase with progressive layers toward the terminal pin 14 and the coefficients of thermal expansion decrease in such progressive layers. This causes the layers with the relatively large coefficients of thermal expansion to melt first during the heating and to solidify last during the cooling. Furthermore, the melting occurs first near the periphery of the terminal assembly 10 and then progresses toward the center of the terminal assembly. The solidification during the cooling operation occurs progressively from the center toward the periphery of the terminal assembly.

The progression from the periphery toward the center in the heating and from the center toward the periphery in the cooling operation offers certain advantages. This is particularly true since the coefficients of thermal expansion increase progressively from the center toward the periphery in the different layers. Since the external layers have increased coefficients of thermal expansion relative to the coefficients of thermal expansion of the internal layers, they are able to compensate more easily than the internal layers for any stresses in the terminal assembly as a result of changes in temperature. Furthermore, each successive layer toward the terminal pin 14 provides a compensation of increased sensitivity because it has a decreased coefficient of thermal expansion in comparison to the coefficient of the layers external to it. This increased sensitivity for each layer can be particularly obtained because the layer 16 provides a thermal stability relative to the terminal pin. This results from the fact that the coefficient of thermal expansion of the layer 16 changes at a rate approaching the rate at which the terminal pin 14 varies with changes in temperature.

Figure 3:
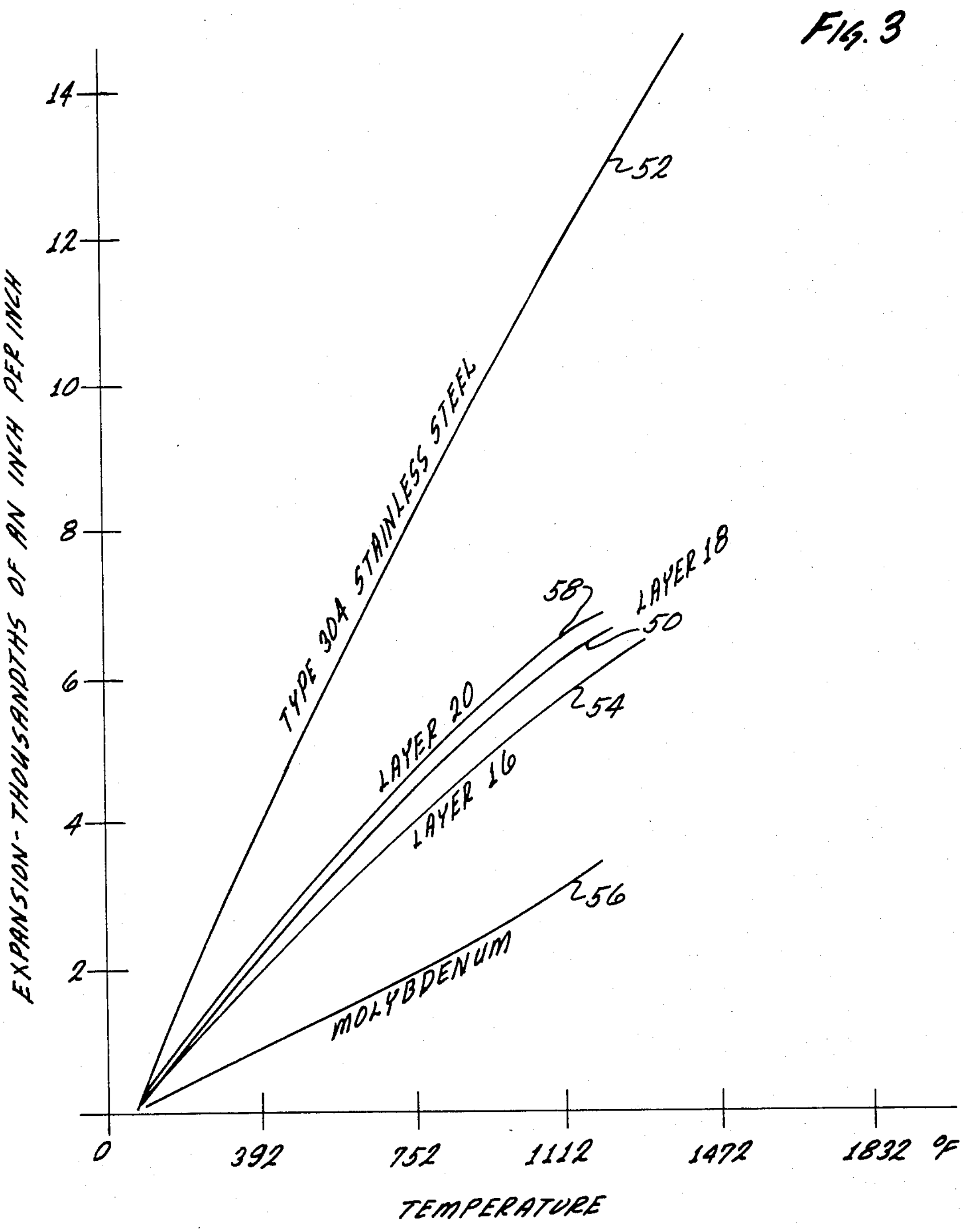
FIG. 3 provides graphs illustrating the coefficient of thermal expansion, with progressive changes in temperature, of various members in the embodiments of FIGS. 1 and 2.

The layer 18 of insulating material also offers other advantages. For example, its coefficient of thermal expansion throughout a range of temperatures to approximately 1000° F. changes at a rate which more nearly approaches the changes in coefficient of thermal expansion of stainless steel in the 300 and 400 series than the coefficient of thermal expansion of the layer 16. This may be seen from FIG. 3. By way of illustration, the coefficient of thermal expansion of the material for the layer 18 varies at substantially a linear rate throughout a range of temperatures to approximately 1000° F. This is illustrated at 50 in FIG. 3. As will be seen at 52 in FIG. 3, the coefficient of thermal expansion for stainless steel of the 300 series varies at a rate approaching the same rate through a range of temperatures to approximately 1000° F. Since the member 12 and the layer 18 of insulating material expand at substantially linear, but different rates with changes in temperature through a wide range to approximately 1000° F., additional stability is imparted by the layers 20 and 22 between the member 12 and the layer 18 with changes in temperature. This is particularly true since the layers 20 and 22 have coefficients of thermal expansion which vary, with changes in temperature, at approximately the same rate as the coefficient of thermal expansion of the layer 18 with such changes in temperatures.

The coefficient of thermal expansion of the layer 16 is lower than the coefficient of thermal expansion of the layer 18 but varies at approximately the same rate as the coefficient of thermal expansion of the layer 18. This is illustrated at 54 for the layer 16. The coefficient of thermal expansion of the terminal pin 14 is lower than that of the layer 16 when the terminal pin is made from molybdenum. This is illustrated at 56 for molybdenum.

The insulating material for the layer 16 may be produced as disclosed in co-pending application Ser. No. 111,787 filed by me on Jan. 9, 1980, for "Insulating Material, Method of Making the Insulating Material and Assembly Incorporating the Material." This application has now been abandoned in favor of continuation application Ser. No. 322,014 filed Nov. 16, 1981, now U.S. Pat. No. 4,461,926. The insulating material for the layer 16 may be formed from the following materials in the following relative amounts by weight:

| Material | Relative Amount by Weight |
|---|---|
| Lead oxide (preferably red lead) | 41.0 |

-continued

| Material | Relative Amount by Weight |
|---|---|
| Zinc oxide | 3.6 |
| Alumina (preferably calcined) | 1.8 |
| Silicon dioxide | 27.0 |
| Cerium oxide | 0.9 |
| Lanthanum oxide | 2.7 |
| Cobalt oxide | 1.4 |
| Sodium antimonate | 7.2 |
| Zinc zirconium silicate | 2.7 |
| Bismuth trioxide | 9.0 |
| Molybdenum trioxide | 2.7 (but as low as 0.5% by weight) |

Oxides selected from a group consisting of the oxides of chromium, nickel and manganese may be substituted for the oxide of cobalt. Oxides selected from a group consisting of the oxides of lithium and potassium may be substituted for the oxide of sodium. The oxide of lanthanum may be substituted for the oxide of cerium. A material such as zinc zirconium silicate may be substituted for the oxide of zinc. However, all of such substitutions may cause the properties of the resultant insulating material to deteriorate slightly from the properties of the material obtained from the mixture specified above.

The insulating material for the layer 16 may be produced by a novel method. The different materials are initially weighted and milled and dried in a dry ball mill for an extended period of time such as approximately three (3) hours. The materials may then be placed in a mullite crucible preheated to a suitable temperature such as approximately 2200° F. The mixture may be heated in the preheated crucible at a suitable temperature such as a temperature of approximately 2200° F. for an extended period of time such as approximately six (6) hours. The mixture may thereafter be air cooled to a suitable temperature such as approximately 1000° F. The material may subsequently be heated in the mullite crucible to an elevated temperature such as approximately 2000° F. for an extended period such as approximately five (5) hours.

The smelted mixture may thereafter be fritted in deionized water and ground into particles in a suitable pulverizer which is non-contaminated. The particles may then be mixed with a suitable binder and may be pressed into beads which are then sintered at a suitable temperature such as approximately 1400° F. A suitable binder may be polyethylene glycol (marketed under the name "Carbowax") or an animal fat.

In the insulating material for the layer 16, the oxides of lead, silicon, bismuth and sodium constitute glass formers. The oxides of cerium, lanthanum, zinc and zirconium produce crystallites. These crystallites have different sizes and shapes to enhance the ability of the insulating material to withstand different operating conditions. The amount of crystallites in the material may be in the order of eighty five percent (85%) to ninety percent (90%) and the remainder of the material may be amorphous. The amorphous portion may be dispersed somewhat uniformly throughout the insulating material.

The oxides of zinc and aluminum tend to increase the viscosity of the insulating material for the layer 16. The oxide of aluminum also increases the melting temperature of the insulating material. In addition to producing crystallites, the oxide of cerium prevents the oxide of lanthanum from crystallizing too quickly or from crystallizing irregularly. As a result, the oxide of cerium is instrumental in providing homogeneity in the insulating material. The oxide of cobalt and the oxide of molybdenum enhance the bond of the insulating material to certain elements such as nickel, vanadium and chromium when the members 12 and 14 are made from a suitable material such as an "INCONEL" alloy. The oxide of bismuth tends to promote high surface resistivity, thereby increasing the electrical resistance of the material. The oxide of bismuth also tends to prevent lead from leaching out of the material.

The insulating material for the insulating layer 18 may be produced as disclosed in a co-pending application Ser. No. 214,256 filed by me on Dec. 8, 1980, for "Insulating Material and Method of Making Material" (now U.S. Pat. No. 4,371,588). The insulating material for the layer 18 may have the following composition:

| Material | Range of Percentages by Weight |
|---|---|
| Lead oxide (red lead) | 57–68 |
| Silicon dioxide | 23–32 |
| Soda ash (sodium carbonate) | 0.4–0.6 |
| Titanium dioxide | 3.2–3.9 |
| Zirconium oxide | 3.0–3.7 |
| Boric acid | 2.2–2.6 |

As is well known, silicon dioxide is a common material in glasses and ceramics. Lead oxide provides a considerable control over the melting temperature of the insulating material for the layer 18 and also provides a considerable control over the characteristics of the coefficient of the thermal expansion of the insulating material. The lead oxide also controls the electrical resistivity of the insulating material for the layer 18. The relative percentages of the silicon dioxide and the lead oxide in the insulating material for the layer 18 tend to control the coefficient of thermal expansion of the material so that the changes in the coefficient of the thermal expansion of the material for the layer 18 are matched to those of the member 12. The matching of such changes in the coefficients of thermal expansion is particularly enhanced because of the relatively high ratio of red lead to silicon dioxide in the insulating material for the layer 18.

Boric acid acts as a glass former. It facilitates the production of at least a partially amorphous state in the insulating material for the layer 18. Sodium carbonate is also a glass former. Since it is actually a powerful glass former, the relatively small amount of soda ash in the insulating material for the layer 18 has a greater effect than the low percentage would indicate. Soda ash is especially helpful in providing the insulating material for the layer 18 with substantially the same changes in the coefficient of thermal expansion as the member 12, particularly when the member is made from a stainless steel of the 300 series. Zirconium oxide and titanium dioxide are crystallites and insure that the insulating material is at least partially crystalline.

The insulating material for the layer 18 may be formed by mixing the different materials in the particular ranges specified above and heating the mixture to a suitable temperature such as a temperature to approximately 1700° F. The mixture may then be maintained at this temperature for a suitable period of time such as a period to approximately three (3) hours. The material may then be quenched in a suitable liquid such as water and then ground and formed into beads.

The insulating material produced for the layer 18 after the quenching operation is primarily amorphous but partially polycrystalline. The relative proportions in the amorphous and polycrystalline states of the insulating materials for the layer 18 are somewhat independent of the temperatures and periods of time in which the mixture is heated. This is particularly true since the mixture tends to become partially amorphous and partially polycrystalline at the time that the mixture melts. As a result, the mixture may be melted repetitively without affecting simultaneously the properties of the material.

The insulating material for the layer 18 has certain important and desirable properties. It is provided with a high electrical resistance such as a resistance in the order of $10^{14}$ to $10^{15}$ ohms. Its coefficient of thermal expansion also changes at progressive temperatures throughout an extended range (such as a range to approximately 1000° F.) at a rate approaching the changes in the coefficient of thermal expansion of the member 12 throughout such range. This is particularly true when the member 12 is made from a stainless steel in the 300 series.

As will be seen, the changes in the coefficients of thermal expansion of the member 12 and the material for the layer 18 are matched approximately throughout a range of temperatures to approximately 1000° F. As a result, the material for the layer 18 is able to maintain the hermetic seal with the member 12 throughout the extended range of temperatures to approximately 1000° F.

As will be appreciated, the compressive force exerted on the member 12 by the material for the layer 18 is dependent upon the difference in the coefficients of thermal expansion of such material and the member 12. Since the difference in the coefficients of thermal expansion remains approximately constant with changes in temperature, the compressive forces on the member 12 exerted by the material for the layer 18 remain approximately constant with such changes in temperature. This facilitates the retention of the hermetic seal between the materials for the layers 16, 18, 20 and 22 and the members 12 and 14 with such changes in temperature.

The percentage of the different oxides in the insulating material for the layer 18 may be as follows to provide for an efficient sealing of the material to the members 12 and 14 when the member 12 is made from stainless steel in the 300 series:

| Material | Percentage by Weight |
|---|---|
| Lead oxide (red lead) | 64.9 |
| Silicon dioxide | 25.4 |
| Soda ash (sodium carbonate) | 0.5 |
| Titanium dioxide | 3.5 |
| Zirconium oxide | 3.3 |
| Boric acid | 2.4 |

The construction of, and method of, forming the layers 20 and 22 are fully disclosed in co-pending application Ser. No. 836,659 filed by me on Sept. 26, 1977, for a "Ceramic Seal and Method of Producing Such Seal" (now U.S. Pat. No. 4,352,951). The layers 20 and 22 of this invention include a pair of fluxes having different melting temperatures. Preferably one of the fluxes has a melting temperature greater by several hundreds of degrees Fahrenheit, such as approximately 200° F. to 300° F. than the other flux. By way of illustration, one of the fluxes (Flux A) may have a melting temperature of approximately 800° F. and a composition as follows:

| Material | Relative Percentage by Weight |
|---|---|
| Lead oxide (PbO) | 68.5 |
| Boric oxide ($B_2O_3$) | 10.5 |
| Silicon dioxide ($SiO_2$) | 21.0 |

The other flux (Flux B) may have a melting temperature of approximately 1000° F. and a composition as follows:

| Material | Relative Percentage by Weight |
|---|---|
| Lead oxide (PbO) | 80.0 |
| Boric oxide ($B_2O_3$) | 20.0 |

Fluxes A and B tend to constitute eutectics which effectively lower the melting point of the boric oxide in the fluxes.

When fluxes A and B are provided as specified above, flux A may have a relative percentage by weight in the material of approximately fifteen percent (15%) to twenty-five percent (25%) and flux B may have a relative percentage by weight in the material of approximately forty percent (40%) to fifty-five percent (55%). A stuffing material having properties of becoming crystalline is also provided in the material in a percentage by weight of approximately twenty percent (20%) to forty-five percent (45%).

The crystal stuffing for the layers 20 and 22 includes oxides of zinc and zirconium and silicon dioxide to provide for the formation of crystals in at least a portion of the material. The oxides of zinc and zirconium and the silicon dioxide may be included in such forms as zinc zirconium silicate, zirconium spinel and zirconium silicate. For example, the crystal stuffing may be formed from the following materials in the following percentages by weight:

| Material | Relative Parts by Weight |
|---|---|
| Lead antimonate ($Pb_3(SbO_4)2)_2$ composed of lead, antimony and oxygen | 2 |
| Zinc zirconium silicate | 1 |
| Zirconium spinel | 1 |
| Zirconium silicate | 1 |

To form the material for the layers 20 and 22 of this invention and to produce hermetic seals with such material, fluxes A and B are first smelted separately and quenched in water to frit the material. For example, flux A may be smelted for a period of approximately two (2) hours at a temperature of approximately 1500° F. and then quenched in water, and flux B may be smelted for a period of approximately one (1) hour at a temperature of approximately 1200° F. and then quenched in water. The crystal stuffing is smelted for a period of approximately three (3) hours at a temperature of approximately 1800° F. and is then quenched in water.

The fritted fluxes and the crystal stuffing are then mixed in the desired percentages and ground such as in a ball mill for a period of approximately three (3) to four (4) hours. The material is then heated to a temperature of approximately 1200° F. for a period of approximately two (2) to three (3) hours. Preferably the material is stirred periodically such as every fifteen (15) minutes while it is being heated. The temperatures and times chosen for such heating operation are such as to partially combine the different compounds in the mixture. As a result, the material is predominately amorphous but a portion has become crystalline. For example, approximately eighty percent (80%) of the material may be amorphous and approximately twenty percent (20%) may be crystalline. The material is then converted to a frit by quenching in water. The resultant material has a melting temperature of approximately 1100° F.

The material for the layers 20 and 22 is then heated to a temperature slightly above its melting temperature for a period of time dependent upon the characteristics desired for the material. For example, the material may be heated to a temperature of approximately 1200° F. (100° F. above the melting temperature) for a period of approximatley three (3) to four (4) hours. The material slowly changes from an amorphous glass to a ceramic as it is being heated.

The temperature and duration of the heating operation for the layers 20 and 22 are chosen so that the coefficient of thermal expansion of the material is slightly less than the coefficient of thermal expansion of the member, such as the ferrule 12 to be sealed. The temperature and duration of the heating operation are such that the material for the layers 20 and 22 is approximately fifty percent (50%) amorphous and approximately fifty percent (50%) crystalline or slightly more crystalline than amorphous.

The fritted material is then pulverized and separated into different sizes. Beads are then formed by mixing particles of different sizes with a suitable material such as polyethylene glycol (marketed under the name "Carbowax") or an animal fat and pressing the particles together. For example, approximately forty percent (40%) of particles by weight of 150 mesh, approximately fifty percent (50%) of particles of 300 mesh and approximately ten percent (10%) of particles above 300 mesh may be mixed with polyethylene glycol or an animal fat where the polyethylene glycol or the animal fat comprises one and one-half percent (1.5%) to three percent (3%) by weight in the mixture. The particles may than be pressed together to form the beads.

The beads are then disposed between the terminal pin 14 and the ferrule 12. The combination is then heated to a suitable temperature such as approximately 1225° F. for a suitable period of time such as a period to approximately thirty (30) minutes. The material then becomes fused to the terminal pin 14 and the ferrule 12. Since the combination is heated for only a relatively short period of time, the crystal structure of the material for the layers 20 and 22 is not changed significantly during the heating operation.

The fusion of the layers 20 and 22 to the ferrule 12 and the terminal pin 14 is facilitated by cooling the material rapidly in air. This causes the material in the layer 22 to press against the ferrule 12 as it is rapidly cooled. By pressing against the ferrule 12 during such cooling, the material facilitates the production of a hermetic seal with the ferrule.

The hermetic seal between the layers 20 and 22 and the ferrule 12 and between the layers 20 and 22 and the terminal pin 14 are produced in various ways. For example, a thin polycrystalline layer is produced in the layers 20 and 22 at the boundaries with the ferrule 12. For example, zinc silicate ($Zn_2SiO_4$) or a relatively complex compound of zinc, oxygen and silicon ($2ZnO.SiO_2$) having the same chemical composition as zinc silicate or a combination of both is formed at such boundary. These crystals tend to become formed in the presence of lead or antimony. These zinc compounds become crystallized in the form of Willemite crystals. Furthermore, crystals of zirconium silicate also become produced at such boundary.

The crystallization of the zirconium silicate occurs in the presence of lead. The crystallization of the zirconium silicate is facilitated by the inclusion of zinc zirconium silicate in the mixture since this compound tends to become dissolved at a lower temperature than zirconium silicate. Zinc zirconium silicate and zirconium silicate tend to exist as natural minerals and are preferably used in this form.

The Willemite crystals are of a different size and shape than the crystals of zirconium silicate. For example, the crystals of zirconium silicate tend to be smaller than the Willemite crystals. This causes nucleations of different sizes to be produced and facilitates the flexing and bending of the crystal layer adjacent the ferrule when subjected to thermal and mechanical shocks. In this way, the hermetic seal is maintained even when the material is subjected to severe thermal or mechanical shocks.

Zirconium spinel tends to increase the mechanical strength of the material. When introduced into the material, zirconium spinel is already in crystalline form so that it does not change as the material is heated and cooled as specified above. As a result, zirconium spinel acts as a filler in the material. Zirconium spinel tends to exist as a natural mineral and is preferably used in this form.

An oxygen valence bond is also produced between the layer 22 and the ferrule 12 to facilitate the formation of a hermetic seal between them. This oxygen valence bond results from a chemical bond between oxygen atoms in the material and atoms on the surface of the ferrule 12. In other words, the oxygen is shared by the layer on the surface of the ferrule 12 and the layer 22. This oxygen valence bond is produced during the heating of the material and the ferrule and the terminal pin to the relatively high temperatures.

The material constituting the layers 20 and 22 also provides other advantages of some importance. For example, the material constituting the layers 20 and 22 provides a high dielectric constant considerably greater than that of most other materials now in use. By way of illustration, the electrical insulation provided by the layers 20 and 22 between the thermal pin 14 and the ferrule 12 is as high as $10^{18}$ ohms. This is important in such equipment as heart pacemakers which have to operate satisfactorily under all of the adverse sets of circumstances which a human body is capable of producing.

The material constituting the layers 20 and 22 also has other advantages of some importance. For example, when the operation is hermetically sealing the terminal pin 14 and the ferrule 12 has been completed, tests are made to determine if a hermetic seal has actually been produced. If a hermetic seal has not be produced, the combination of the terminal pin, the ferrule and the layers 16, 18, 20 and 22 may be fused at the temperature of approximately 1200° F. for an additional period to approximately thirty (30) minutes. Since the material constituting the layers 20 and 22 is still somewhat amorphous, this additional fusing operation tends to facilitate the creation of the oxygen valence bond between the material and the ferrule 12 and between the material and the terminal pin 14. It also tends to facilitate the creation of a polycrystalline structure in the material, particularly at the surface adjacent the ferrule 12. As a result, any failure to produce a hermetic seal tends to become corrected.

The layer 20 may be provided with the following composition:

| Material | Relative Amounts in Mixture |
|---|---|
| Zirconium silicate | 6.8 |
| Zinc zirconium silicate | 3.4 |
| Boric acid | 14.0 |
| Zirconium spinel | 3.4 |
| Red lead | 61.3 |
| Bismuth trioxide | 6.8 |
| Quartz | 4.3 |

The fusing temperature of the layer 20 is approximately 1200° F.

The layer 22 may be provided with the same composition as the layer 20 except that it does not include any silicon dioxide. The layer 22 may be formed by substantially the same method as that described above for the layer 20. However, the layer 22 may have a melting temperature of approximately 1160° F.

After being stacked between the members 12 and 14, the beads of the materials for the layers 16, 18, 20 and 22 and the members 12 and 14 are heated to an elevated temperature for a limited period of time. For example, the heating may be provided to a suitable temperature such as approximately 1800° F. for a limited period of time such as a period of approximately thirty (30) minutes to produce the seal between the member 14 and the insulating material for the layer 16. Such heating simultaneously fuses the insulating material for the layers 18, 20 and 22 to the ferrule 12 and the terminal pin 14. A temperature of approximately 1800° F. is desirable because it constitutes the highest of the temperatures required to fuse the insulating materials to the members 12 and 14.

The coefficient of thermal expansion of the layer 22 is higher than the coefficient of thermal expansion of the layers 16 and 18 but changes at approximately the same rate as the layers 16 and 18. This is illustrated at 58 in FIG. 3. The coefficient of thermal expansion of the layer 20 is lower than the coefficient of thermal expansion of the layer 22 because it includes quartz.

Figure 2:
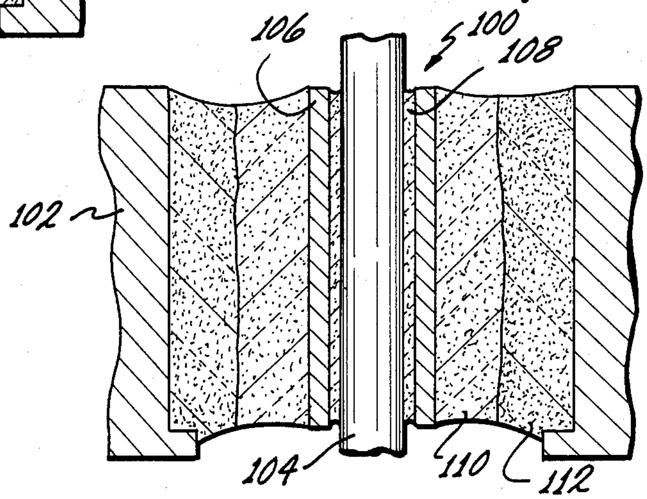
FIG. 2 is a fragmentary sectional view of a second embodiment of the invention.

FIG. 2 illustrates another embodiment of the invention. In FIG. 2, a terminal assembly generally indicated at 100 is provided with a ferrule 102 and a terminal pin 104, which may respectively correspond to the ferrule 12 and the terminal pin 14 in FIG. 1. A member 106 may be disposed in spaced relationship, preferably in closely spaced relationship, to the terminal 104. When the ferrule 102 is an annular sleeve, the member 106 may also be annular and may be concentric with the ferrule 102 and the terminal pin 104. The member 106 may be made from a suitable material such as nickel, Inconel, titanium and a stainless steel of the 300 and 400 series.

A layer 108 of insulating material is disposed between the terminal pin 104 and the sleeve 106 is hermetically sealed to the terminal pin and the sleeve. The layer 108 may be made from substantially the same material as the layer 18 in FIG. 1. At least one layer 110 is disposed in the space between the sleeves 106 and 102 and is hermetically sealed to the sleeves. When only a single layer 110 is disposed in the space between the sleeves 106 and 102, the layer 110 may be made from a material such as that specified above for the layer 20 in FIG. 1. Preferably at least two layers 110 and 112 are disposed between the sleeves 106 and 102 and hermetically sealed to the sleeves and to each other. When two layes 110 and 112 are disposed in the space between the sleeves 106 and 102, the layers may be provided with compositions respectively corresponding to the compositions of the layers 20 and 22 in FIG. 1.

The embodiment described above and shown in FIG. 2 has most of the advantages of the embodiment shown in FIG. 1. For example, the layers 108, 110 and 112 have substantially the same physical disposition relative to one another and to the ferrule 102 and the terminal pin 104 as the corresponding members shown in FIG. 1. Furthermore, the sleeve 106 provides a barrier against the imposition of forces against the terminal pin 104. Since the sleeves 106 and the layer 108 of insulating material have substantially the same rates of thermal expansion, the hermetic seal of these members to the terminal pin 104 tends to be maintained over a high range of temperatures. This stability with change in temperature is further facilitated by the progressive increase in the coefficient of thermal expansion, and the progressive decrease of melting temperatures, of the layers 108, 110 and 112.

Although this application has been disclosed and illustrated with reference to particular applications, the principles involved are susceptible of numberous other applications which will be apparent to persons skilled in the art. The invention is, therefore, to be limited only as indicated by the scope of the appended claims.

I claim:

1. In combination, a first electrically conductive member having a relatively high coefficient of thermal expansion, a second electrically conductive member spaced from the first electrically conductive member and having a relatively low coefficient of thermal expansion, and at least first and second layers of electrically insulating material respectively disposed between the first and second members in hermetically sealed relationship to each other and to the first and second members, the first layer of insulating material having a lower coefficient of thermal expansion than that of the first member, the second layer of insulating material having a coefficient of thermal expansion less than that of the first layer of insulating material and greater than that of the second member, the first and second layers of insulating material being partially amorphous and partially polycrystalline.

2. The combination set forth in claim 1 wherein the first member is made from a material selected from the group consisting of stainless steels of the 300 and 400 series, titanium, nickel and an alloy containing nickel, cobalt, vanadium and chromium.

3. The combination set forth in claim 1 wherein a third layer of insulating material is disposed between the second member and the second layer of insulating material and is hermetically sealed to the second member and the second layer of insulating material and is provided with a coefficient of thermal expansion which changes at a rate between the rates at which the coefficients of thermal expansion of the second layer of insulating material and the second member change.

4. The combination set forth in claim 1 wherein the first and second layers of insulating material have different melting temperatures and wherein the layer of insulating material with the lower coefficient of thermal expansion has the higher melting temperature.

5. In combination, a first electrically conductive member having a relatively high coefficient of thermal expansion, a second electrically conductive member spaced from the first electrically conductive member and having a relatively low coefficient of thermal expansion, and at least first and second layers of electrically insulating material respectively disposed between the first and second members in hermetically sealed relationship to each other and to the first and second members, the first layer of insulating material having a lower coefficient of thermal expansion than that of the first member, the second layer of insulating material having a coefficient of thermal expansion less than that of the first layer of insulating material and greater than that of the second member, the first and second layers of insulating material being partially amorphous and partially polycrystalline, a third member disposed between the first and second members and hermetically sealed to the second member and the second insulating layer and provided with a coefficient of thermal expansion approximately that of the first member, and an additional layer of insulating material, the additional layer of insulating material being disposed between the second and third members and hermetically sealed to the second and third members.

6. In combination, a first electrically conductive member having a relatively high coefficient of thermal expansion, a second electrically conductive member spaced from the first electrically conductive member and having a relatively low coefficient of thermal expansion, and at least first and second layers of electrically insulating material respectively disposed between the first and second members in hermetically sealed relationship to each other and to the first and second members, the first layer of insulating material having a lower coefficient of thermal expansion than that of the first member, the second layer of insulating material having a coefficient of thermal expansion less than that of the first layer of insulating material and greater than that of the second member, the first and second layers of insulating material being partially amorphous and partially polycrystalline, and a layer of insulating material having properties of withstanding large forces without any degradation and disposed between the second member and the second insulating layer in hermetically sealed relationship to the second member and the second insulating layer.

7. In combination, a first electrically conductive member having a relatively high coefficient of thermal expansion, a second electrically conductive member spaced from the first electrically conductive member and having a relatively low coefficient of thermal expansion, and at least first and second layers of electrically insulating material respectively disposed between the first and second members in hermetically sealed relationship to each other and to the first and second members, the first layer of insulating material having a lower coefficient of thermal expansion than that of the first member, the second layer of insulating material having a coefficient of thermal expansion less than that of the first layer of insulating material and greater than that of the second member, the first and second layers of insulating material being partially amorphous and partially polycrystalline, a third member disposed between the first and second members and hermetically sealed to the second member and the second insulting layer and provided with a coefficient of thermal expansion approximately that of the first member, the first member being selected from the group consisting of nickel, titanium, stainless steels of the 300 and 400 series and alloys containing nickel, cobalt, vanadium and chromium and the third member being selected from the group consisting of nickel, titanium, stainless steels of the 300 and 400 series and alloys containing nickel, cobalt, vanadium and chromium, and an additional layer of insulating material, the additional layer of insulating material being hermetically sealed to the second and third members.

8. In combination, a first electrically conductive member having a particular coefficient of thermal expansion throughout a particular temperature range, a second electrically conductive member disposed in spaced relationship to the first electrically conductive member and having a coefficient of thermal expansion less than the particular coefficient, a first layer of insulating material hermetically sealed to the first electrically conductive member, the first layer of insulating material having a coefficient of thermal expansion less than the particular coefficient of thermal expansion throughout the particular temperature range, a second layer of insulating material hermetically sealed to the first layer of insulating material, the second layer of insulating material being provided with a coefficient of thermal expansion less than that of the first insulating layer, and a third layer of insulating material hermetically sealed to the second layer of insulating material and to the second electrically conductive member, the third layer of insulating material being provided with a thermal coefficient of expansion less than that of the second insulating layer, the first, second and third layers of insulating material being partially amorphous and partially polycrystalline.

9. The combination set forth in claim 8, including, a fourth layer of insulating material disposed between, and hermetically sealed to, the second electrically conductive member and the third layer of insulating material, the fourth layer of insulating material being provided with properties of being able to withstand high forces without degradation.

10. The combination set forth in claim 9 wherein the first electrically conductive member is selected from the group consisting of titanium, nickel, stainless steels of the 300 and 400 series and alloys containing nickel, cobalt, vanadium and chromium.

11. The combination set forth in claim 10 wherein the second electrically conductive member is molybdenum.

12. The combination set forth in claim 8, including, means disposed between the third layer of the insulating material and the second member for hermetically sealing the third layer of the insulating material and the second member.

13. The combination set forth in claim 8 wherein the third layer of insulating material has a higher melting temperature than the second layer of insulating material and the second layer of insulating material has a higher melting temperature than the first layer.

14. In combination, a first electrically conductive member having a particular relationship between its coefficient of thermal expansion and progressive temperatures throughout a particular temperature range, a second electrically conductive member disposed in spaced relationship to the first electrically conductive member and having a coefficient of thermal expansion less than the particular coefficient, a first layer of insulating material hermetically sealed to the first electrically conductive member, the first layer of insulating material having a coefficient of thermal expansion less than the particular coefficient, a second layer of insulating material hermetically sealed to the first layer of insulating material, the second layer of insulating material being provided with a coefficient of thermal expansion less than that of the first insulating layer, and a third layer of insulating material hermetically sealed to the second layer of insulating material, the third layer of insulating material being provided with a thermal coefficient of expansion less than that of the second insulating layer, the first, second and third layers of insulating material being partially amorphous and partially polycrystalline, a third electrically conductive member disposed between, and hermetically sealed to, the second electrically conductive member and the third layer of insulating material, the third electrically conductive member being provided with a coefficient of thermal expansion corresponding substantially to that of the first electrically conductive member, and an additional layer of insulating material disposed between the second member and the third member and hermetically sealed to the second and third members.

15. The combination set forth in claim 14 wherein the first electrically conductive member is selected from the group consisting of titanium, nickel, stainless steels of the 300 and 400 series and alloys containing nickel, cobalt, vanadium and chromium and the third electrically conductive member is selected from the group consisting of nickel, titanium, stainless steels of the 300 and 400 series and alloys containing nickel, cobalt, vanadium and chromium.

16. The combination set forth in claim 15 wherein the second electrically conductive member is molybdenum.

17. In combination, a first electrically conductive member having a particular coefficient of thermal expansion, a second electrically conductive member disposed in spaced relationship to the first member and having a coefficient of thermal expansion less than the particular coefficient, and a plurality of layers of insulating material disposed between the first and second members and each hermetically sealed to the adjacent ones of the other layers and the first and second members and providing a high electrical resistivity, each of the layers of insulating material having a coefficient of thermal expansion progressively less than the particular coefficient but greatere than the coefficient of thermal expansion of the second electrcially conductive member, the progressive layers of insulating material from the first member having coefficients of thermal expansion of decreased value, the progressive layers of insulating material being partially amorphous and partially polycrystalline.

18. The combination set forth in claim 17, including, the layers of insulating material progressively displaced from the first member having increased melting temperatures relative to the melting temperatures of the layers of the insulating material closer to the first member.

19. The combination set forth in claim 18 wherein the insulating materials for different layers in the plurality are formed from oxides and wherein particular ones of the layers in the plurality are formed from the same oxides but in different proportions.

20. The combination set forth in claim 17, including, a third member, and an additional layer of insulating material, the additional layer of insulating material being disposed between the second and third members and hermetically sealed to the second and third members.

21. The combination set forth in claim 20 wherein the first member is selected from the group consisting of titanium, nickel, stainless steels of the 300 and 400 series and alloys containing nickel, cobalt, vanadium and chromium.

22. The combination set forth in claim 21 wherein the second member is molybdenum.

23. The combination set forth in claim 20 wherein the first member is selected from the group consisting of nickel, titanium and stainless steels of the 300 and 400 series and alloys containing nickel, colbalt, vanadium and chromium and the third member is selected from the group consisting of nickel, titanium, stainless steels of the 300 and 400 series and alloys containing nickel, cobalt, vanadium and chromium.

24. The combination set forth in claim 23 wherein the second member is molybdenum.

25. The combination set forth in claim 17, including, an additional layer of insulating material disposed between the second member and the layer of insulating material in hermetically sealed relationship with the second member, the additional layer of insulating material being provided with properties of resisting substantial forces without any deterioration in such hermetic seal, the additional layer of insulating material having partially amorphous and partially polycrystalline properties.

26. The combinatin set forth in claim 17 wherein the layers of insulating material are ceramic and the progressive layers of insulating material from the first member have increased melting temperatures.

27. The combination set forth in claim 17 wherein the different layers of insulating material have different melting temperatures and the melting temperatures of the layers of insulating material with the higher coefficients of thermal expansion are lower than the melting temperatures of the layers of insulating material with the lower coefficients of thermal expansion.

28. In combination, a first electrically conductive member having a particular coefficient of thermal expansion throughout a particular temperature range, a second electrically conductive member disposed in spaced relationship to the first electrically conductive member and having a coefficient of thermal expansion less than the particular coefficient, a first layer of insulating material hermetically sealed to the first electrically conductive member, the first layer of insulating material having a coefficient of thermal expansion less than the particular coefficient but greater than the coefficient of thermal expansion of the second member, a second layer of insulating material hermetically sealed to the first layer of insulating material, the second layer of insulating material being provided with a coefficient of thermal expansion less than that of the first insulating layer but greater than that of the second member, and a third layer of insulating material hermetically sealed to the second layer of insulating material and to the second electrically conductive member, the third layer of insulating material being provided with a thermal coefficient of expansion less than that of the second insulating layer but greater than that of the second member, the first, second and third layers of insulating material being partially amorphous and partially polycrystalline, the first, second and third layers of insulating material being ceramic and the first layer of insulating material being primarily amorphous and the second layer of insulating material being primarily amorphous and the third insulating layer being primarily polycrystalline.

29. In combination, a first electrically conductive member having a particular coefficient of thermal expansion, a second electrically conductive member disposed in spaced relationship to the first member, and at least a pair of layers of insulating material disposed between the first and second members and hermetically sealed to the first and second members, at least one of the layers of insulating material having a coefficient of thermal expansion different from the particular coefficient, the layers of insulating material being positioned in a particular relationship between the first and second members to provide a closer relationship between the coefficients of thermal expansion of the first electrically conductive member and a first one of the layers of insulating material than between the coefficients of thermal expansion of the first electricallly conductive member and the other layer of insulating material and to provide a closer relationship between the coefficients of thermal expansion of the second electrically conductive member and the other layer of insulating material than between the second electrically conductive member and the first layer of insulating material, the layers of insulating material being partially amorphous and partially polycrystalline, said first one of the layers of insulating material being closer to the firsr member than the other layer of insulating material and the other layer of insulating material being closer to the second member than the first layer of insulating material.

30. The combination set forth in claim 29 wherein the second member has a lower coefficient of thermal expansion than the particular coefficient and wherein the first layer of insulating material and the other layer of insualting material have coefficients of thermal expansion between the coefficients of thermal expansion of the first and second members.

31. The combination set forth in claim 30, including, an additional layer of insulating material disposed between the second member and the other layer of insulating material and hermetically sealed to the second member and the other layer of insulating material and having a lower coefficient of thermal expansion than the coefficient of thermal expansion of the first layer and the other layer of insulating material and a higher coefficient of thermal expansion than the second member.

32. The combination set forth in claim 31 wherein the first layer, the other layer and the additional layer of insulating material have progressively decreased melting temperatures relative to one another.

33. The combination set forth in claim 30 wherein the first layer and the other layer of insulating material are ceramic.

34. The combination set forth in claim 30 wherein the first layer of insulating material is formed from a plurality of oxides and the other layer of insulating material is formed from substantially all of the plurality of oxides.

35. The combination set forth in claim 30 wherein the other layer of insulating material has a higher melting temperature than the first layer of insulating material.

36. The combination set forth in claim 29 wherein the layers of insulating material are ceramic and each of the first layer and the other layer of ceramic insulating material are formed from a plurality of oxides and the oxides for each of the first layer and the other layer of ceramic insulating material are substantially identical.

37. The combination set forth in claim 29, icluding, a third layer of insulating material disposed between the second member and the first layer and the other layer of insulating material and provided with hard characteristics to protect the second member.

38. The combination set forth in claim 37 wherein the first layer and the othe layer of insulating material are ceramic.

39. The combination set forth in claim 29, including, the insulating material of the first layer and the other layer being ceramic, and means disposed between the second member and the first layer and the other layer of ceramic insulating material and hermetically sealed to the second member and at least one of the first layer and the other layer of ceramic insulating material for providing protection to the second member.

40. The combination set forth in claim 39 wherein the protective means include a third electrically conductive member having substantially the particular coefficient of thermal expansion.

41. The combination set forth in claim 29 wherein the particular one of the layers of insulating material having the lower coefficient of thermal expansion has a higher melting temperature than the other one of the layers of insulating material.

42. In combination, a first member having a particular coefficient of thermal expansion which changes in a particular relationship with changes in temperature, a second member disposed in spaced relationship to the first member and having a lower coefficient of thermal expansion than the first member, at least a first layer of ceramic insulating material hermetically sealed to the first member and having a coefficient of thermal expansion less than that of the particular coefficient but greater than that of the second member, the first layer of ceramic insulating material being partially amorphous and partially polycrystalline, and a second layer of ceramic insulating material hermetically sealed to the second member and the first layer of ceramic insulating material and having a coefficient of thermal expansion less than that of the first layer but greater than that of the second member, the second layer of ceramic insulating material being partially amorphous and partially crystalline.

43. The combination set forth in claim 42 wherein the second layer of insulating material has a higher melting temperature than the first layer.

44. The combination set forth in claim 42, including, a third layer of ceramic insulating material disposed between the first and second layers of ceramic insulating material and hermetically sealed to the first and second layers of ceramic insulating material and having a coefficient of thermal expansion between those of the first and second layers of ceramic insulating material, the third layer of ceramic insulating material being partially amorphous and partially polycrystalline.

45. The combination set forth in claim 44 wherein the first and second members are electrically conductive.

46. The combination set forth in claim 42, including, protective means disposed between the second member and the second layer of insulating material and hermetically sealed to the second member and the second layer of insulating material for protecting the combination against forces imposed upon the combination.

47. The combination set forth in claim 46 wherein the first and second members are electrically conductive, and the protective means includes a third electrically conductive member having substantially the particular coefficient of thermal expansion.

48. The combination set forth in claim 47, including, an additional layer formed from the same ceramic insulating material as the second layer, the additional layer being disposed between the second and third electrically conductive members and being heremtically sealed to the second and third electrically conductive members.

49. The combination set forth in claim 46 wherein the protective means constitutes a third layer of a ceramic insulating material having hard properties.

50. The combination set forth in claim 42 wherein the first and second members are electrically conductive.

* * * * *